(12) United States Patent
Lin et al.

(10) Patent No.: US 8,302,313 B2
(45) Date of Patent: Nov. 6, 2012

(54) METHOD OF MANUFACTURING A BASE

(75) Inventors: Yu-Sheng Lin, Hsinchu (TW);
Ted-Hong Shinn, Hsinchu (TW);
Wan-Tien Chen, Hsinchu (TW);
Chi-Ming Wu, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 464 days.

(21) Appl. No.: 12/699,045

(22) Filed: Feb. 3, 2010

(65) Prior Publication Data
US 2011/0088238 A1 Apr. 21, 2011

(30) Foreign Application Priority Data
Oct. 21, 2009 (TW) .............................. 98135589 A (51) Int. Cl.
*B23P 15/12* (2006.01)
(52) U.S. Cl. ..................... 29/897.31; 29/897.32; 53/486; 53/491; 206/490; 206/708; 248/346.06
(58) Field of Classification Search .................. 29/897.3, 29/897.31, 897.32; 53/486, 491, 376.3, 376.4, 53/377.6; 206/708, 459.5, 463, 461, 482, 206/486, 490; 248/346.06
See application file for complete search history.

(56) References Cited

U.S. PATENT DOCUMENTS

| | | | | |
|---|---|---|---|---|
| 2,664,258 A | * | 12/1953 | Lanier | 248/172 |
| 5,216,576 A | * | 6/1993 | Dilko et al. | 361/644 |
| 5,768,096 A | * | 6/1998 | Williams et al. | 361/679.04 |
| 7,032,872 B2 | * | 4/2006 | Sullivan | 248/346.07 |
| 7,090,187 B2 | * | 8/2006 | Tusavitz | 248/346.07 |
| 7,440,265 B2 | * | 10/2008 | Ou Yang | 361/679.27 |
| 7,515,221 B2 | * | 4/2009 | Jeon | 349/58 |
| 7,515,403 B2 | * | 4/2009 | Hong | 361/679.22 |
| 7,967,269 B2 | * | 6/2011 | Liu | 248/287.1 |
| 8,000,091 B2 | * | 8/2011 | Shinn et al. | 361/679.1 |
| 8,118,272 B2 | * | 2/2012 | Liou | 248/287.1 |
| 8,164,707 B2 | * | 4/2012 | Yan | 349/60 |
| 2007/0157388 A1 | * | 7/2007 | Mossbeck et al. | 5/618 |

FOREIGN PATENT DOCUMENTS

| | | |
|---|---|---|
| CN | 101334539 A | 12/2008 |
| TW | I1286247 | 9/2007 |
| TW | 200938929 | 9/2009 |

OTHER PUBLICATIONS

Search Report—Office Action.

* cited by examiner

*Primary Examiner* — Derris Banks
*Assistant Examiner* — Azm Parvez
(74) *Attorney, Agent, or Firm* — Chun-Ming Shih (57) ABSTRACT

A method of manufacturing a base includes the following steps. First, a plate is provided. Next, the plate is machined to form a bottom frame. The bottom frame has a bottom portion and a plurality of side walls disposed at the bottom portion. Next, whether the bottom frame is designed for being assembled to a first display panel or a second display panel is determined. The size of the first display panel is different from that of the second display panel. Next, if the bottom frame is designed for being assembled to the first display panel, a pad is formed on the bottom portion of the bottom frame such that a first base is formed. Next, if the bottom frame is designed for being assembled to the second display panel, the bottom portion is punched to form a plurality of barricades such that a second base is formed.

3 Claims, 7 Drawing Sheets

METHOD OF MANUFACTURING A BASE

CROSS-REFERENCE

This application claims priority to Taiwan application No. 098135589 filed on Oct. 21, 2009.

BACKGROUND

1. Field of the Invention

The present invention relates a method of manufacturing a carrying element, and more particularly to a method of manufacturing a base.

2. Description of the Related Art

Figure 1:
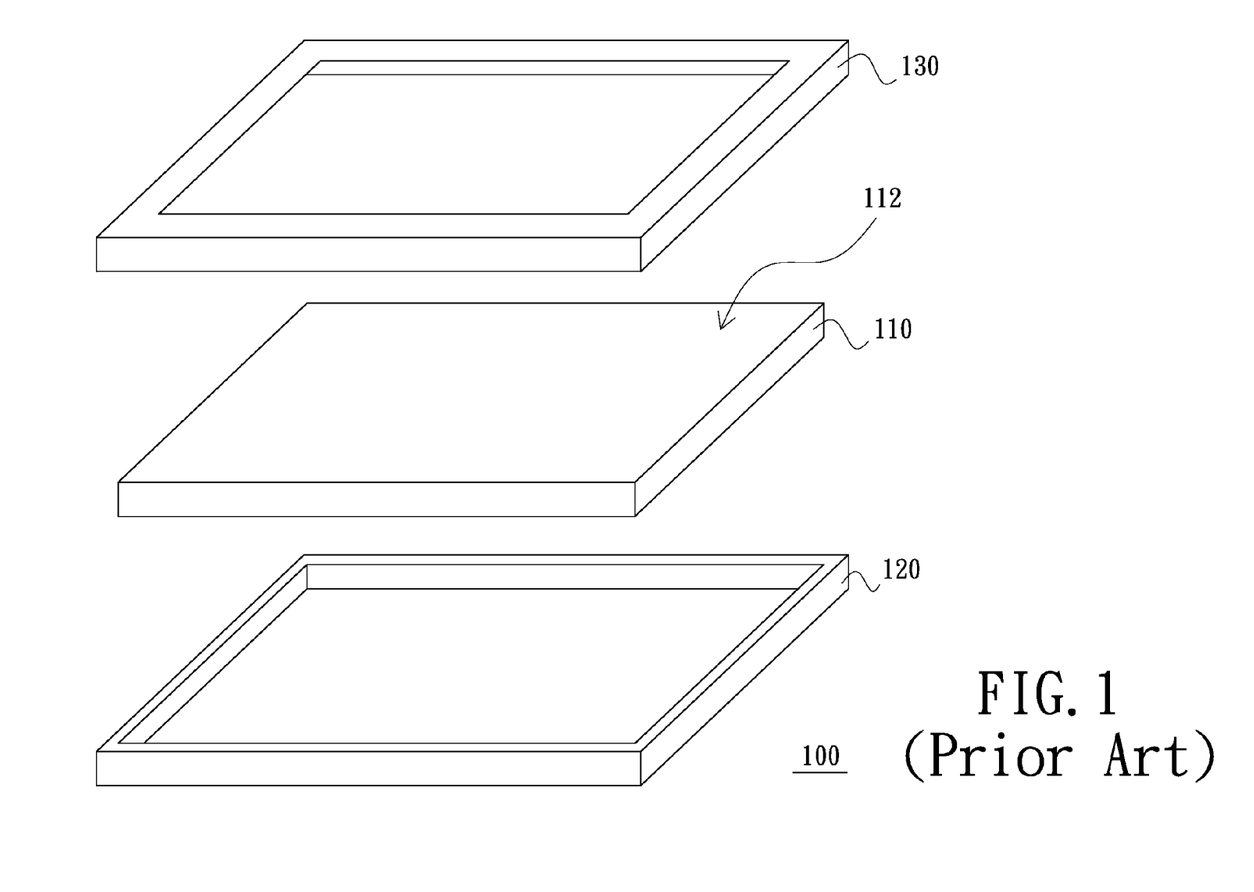
FIG. 1 is a schematic three-dimensional exploded view of a conventional electrophoretic display.

FIG. 1 is a schematic three-dimensional exploded view of a conventional electrophoretic display. Referring to FIG. 1, the conventional electrophoretic display 100 includes an electrophoretic display panel 110, a base 120 and a top frame 130. The top frame 130 is assembled to the base 120. The electrophoretic display panel 110 is disposed between the top frame 130 and the base 120. The view area 112 of the electrophoretic display panel 110 is exposed by the top frame 130.

However, the sizes of the electrophoretic display panels can be changed according to different requirements of the different designers. For example, the size of the rigid electrophoretic display panel is usually different from that of the flexible electrophoretic display panel. Therefore, in the conventional art, the manufacturer must re-make the corresponding bases respectively for the electrophoretic display panels of different sizes such that the electrophoretic display panels of different sizes can be disposed at the corresponding bases, respectively. Accordingly, in the conventional art, the cost of manufacturing the bases of different sizes is relatively high and the complexity of manufacturing the bases of different sizes is relatively great.

BRIEF SUMMARY

The present invention is directed to provide a method of manufacturing a base. In the method of manufacturing a base, a bottom frame of one size can be machined, and a first base applicable to a first display panel of a first size or a second base applicable to a second display panel of a second size is manufactured from the bottom frame.

The present invention provides a method of manufacturing a base including the following steps. First, a plate is provided. Next, the plate is machined to form a bottom frame. The bottom frame has a bottom portion and a plurality of side walls disposed at the bottom portion. The side walls and the bottom portion together form a first accommodating space. Next, whether the bottom frame is designed for being assembled to a first display panel or a second display panel is determined. The thickness of the first display panel is smaller than that of the second display panel. The length of the first display panel is larger than that of the second display panel. The width of the first display panel is larger than that of the second display panel.

Next, if the bottom frame is designed for being assembled to the first display panel, at least one pad is formed at the bottom portion of the bottom frame such that a first base adapted to be assembled to the first display panel is formed. The first display panel is adapted to be disposed on the pad and located in the first accommodating space. Next, if the bottom frame is designed for being assembled to the second display panel, the bottom portion of the bottom frame is punched to form a plurality of barricades such that a second base adapted to be assembled to the second display panel is formed. The barricades are arranged along the side walls. Each of the barricades maintains a distance from the corresponding side wall. The barricades and the bottom portion together form a second accommodating space in the first accommodating space. The second display panel is adapted to be disposed in the second accommodating space.

In an embodiment of the present invention, after the barricades are formed, a buffer is disposed between each of the barricades and the corresponding side wall.

In an embodiment of the present invention, the bottom frame further has at least one arc-shaped connection portion. The side walls and the arc-shaped connection portion are disposed on the bottom portion. The arc-shaped connection portion connects two of the side walls and is bendingly disposed between the corresponding two of the side walls.

According to an aspect of an embodiment, the bottom frame of one size can be machined, and the first base applicable to the first display panel of the first size or the second base applicable to the second display panel of the second size is manufactured from the bottom frame. Therefore, compared to the conventional art, the cost of selectively manufacturing the different bases according to the method of the embodiment of the present invention is relatively low. In addition, the complexity of selectively manufacturing the different bases according to the method of the embodiment of the present invention is relatively little.

BRIEF DESCRIPTION OF THE DRAWINGS

The accompanying drawings are included to provide a further understanding of the invention, and are incorporated in and constitute part of this specification. The drawings illustrate embodiments of the invention and, together with the description, serve to explain the principles of the invention.

DETAILED DESCRIPTION

Figure 2:
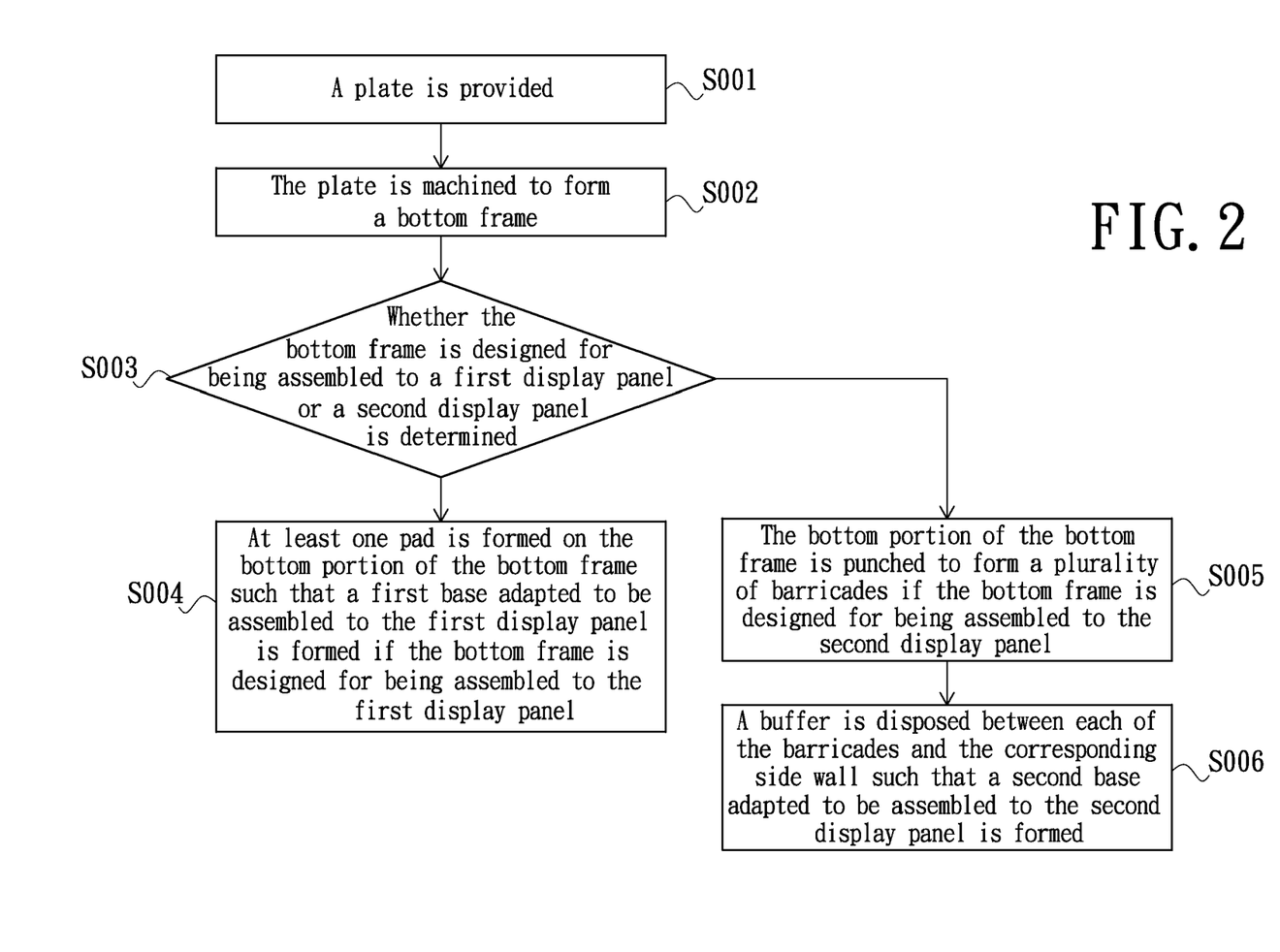
FIG. 2 is a flow chart of a method of manufacturing a base according to an embodiment of the present invention.
Figure 4:
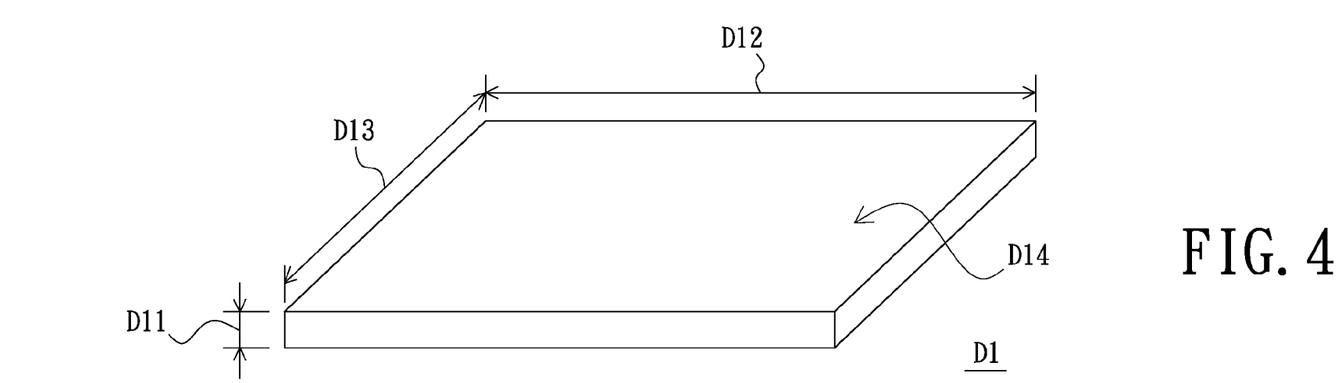
FIG. 4 is a schematic three-dimensional view of a first display panel of the present embodiment.
Figure 5:
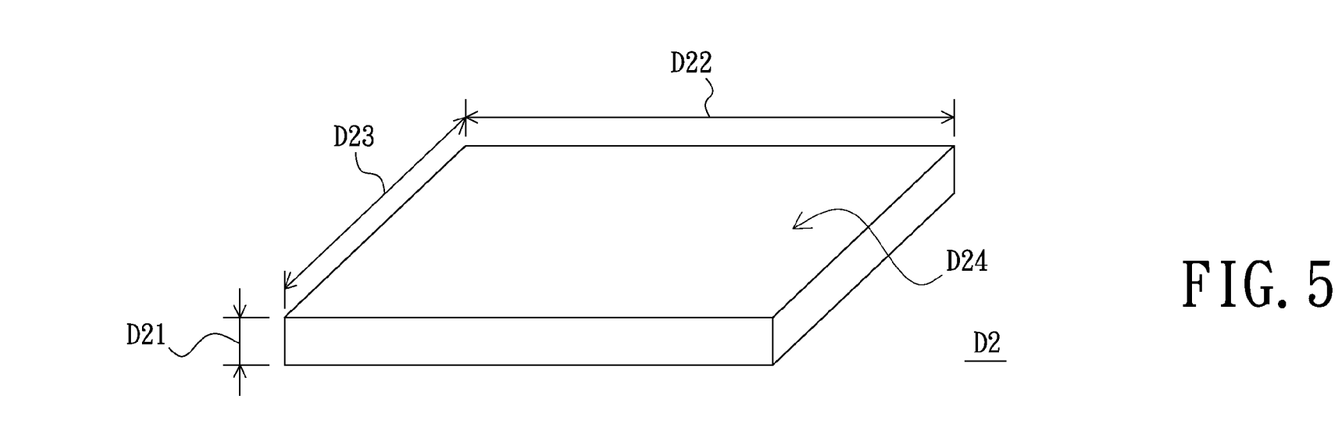
FIG. 5 is a schematic three-dimensional view of a second display panel of the present embodiment.
Figure 6:
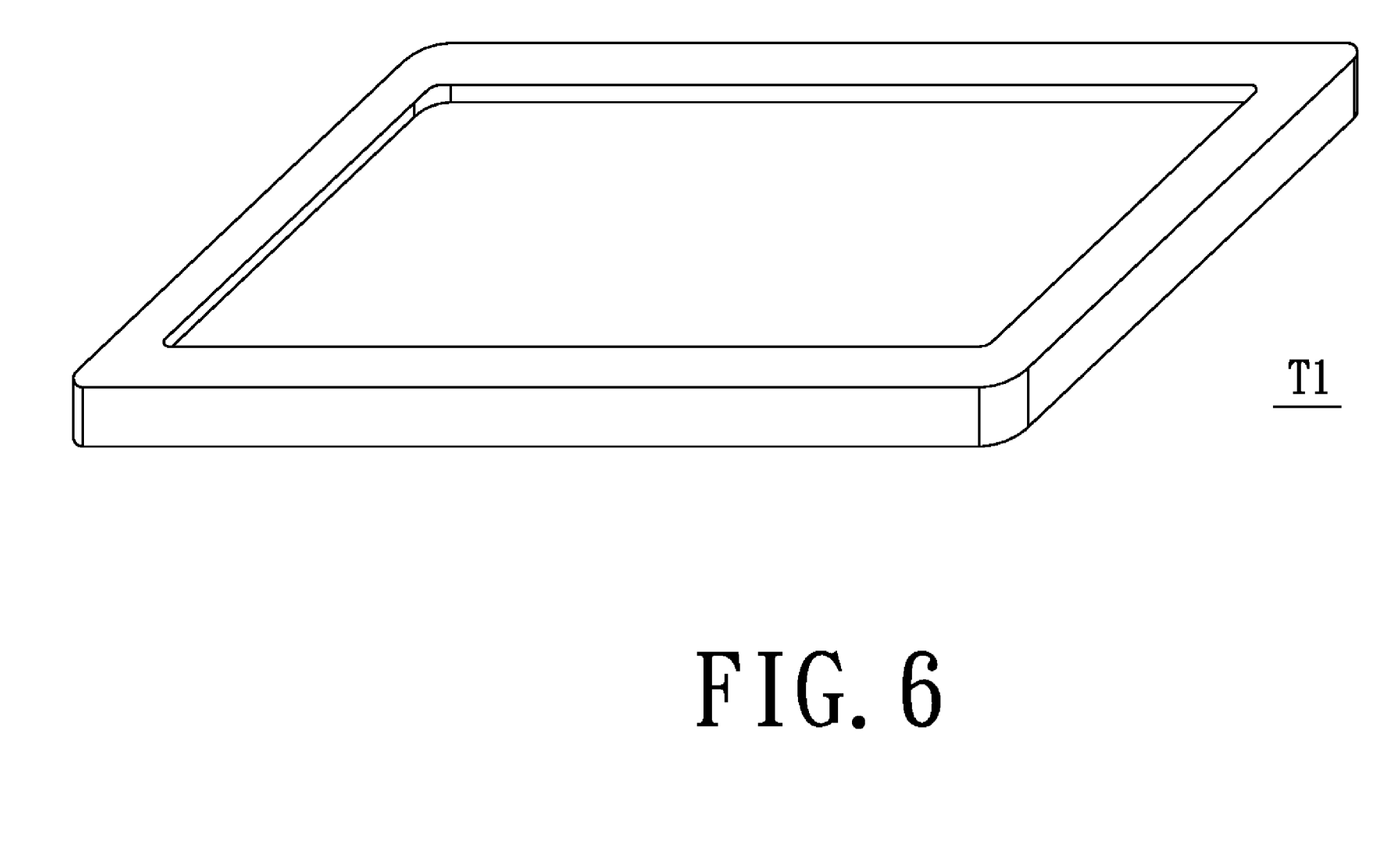
FIG. 6 is a schematic three-dimensional view of a top frame of the present embodiment.

FIG. 2 is a flow chart of a method of manufacturing a base according to an embodiment of the present invention. FIGS. 3A to 3E are schematic views of manufacturing a base according to the method illustrated in FIG. 2. FIG. 4 is a schematic three-dimensional view of a first display panel of the present embodiment. FIG. 5 is a schematic three-dimensional view of a second display panel of the present embodiment. FIG. 6 is a schematic three-dimensional view of a top frame of the present embodiment. The method of manufacturing a base of the present embodiment includes the following steps. First, referring to FIGS. 2 and 3A, at step S001, a plate P1 is provided. The plate P1 may be composed of a metal. Next, referring to FIGS. 2 and 3B, at step S002, the plate P1 is machined to form a bottom frame F1. The bottom frame F1 has a bottom portion F11 and a plurality of side walls F12. The side walls F12 are disposed at the bottom portion F11. The side walls F12 and the bottom portion F11 together form a first accommodating space S1.

Figure 3A:
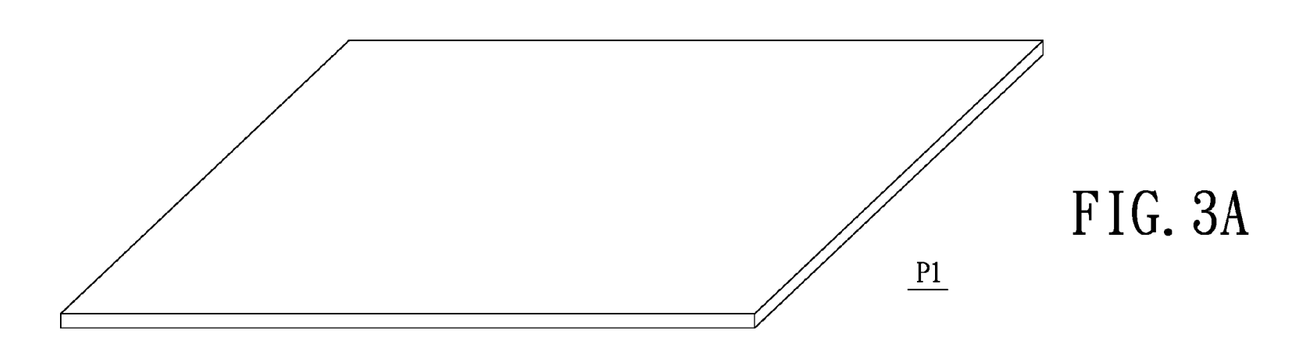
FIGS. 3A to 3E are schematic views of manufacturing a base according to the method illustrated in FIG. 2.
Figure 3B:
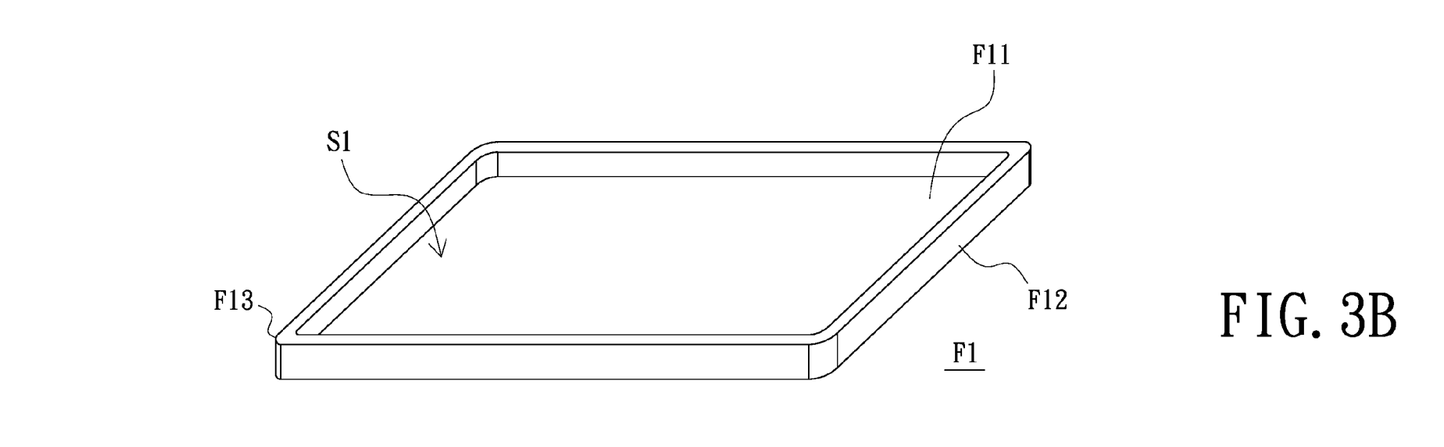

In the present embodiment, the bottom frame F1 may further have at least one arc-shaped connection portion F13 (a plurality of arc-shaped connection portions F13 are schematically shown in FIG. 3B). The side walls F12 and the arc-shaped connection portions F13 are disposed on the bottom portion F11. Each of the arc-shaped connection portions F13 connects two of the side walls F12 and is bendingly disposed between the two corresponding side walls F12. Because the bottom frame F1 has arc-shaped connection portions F13, the structural strength of the bottom frame F1 as a whole is improved.

Next, referring to FIGS. 2, 4 and 5, at step S003, whether the bottom frame F1 is designed for being assembled to a first display panel D1 or a second display panel D2 is determined. In a practical production process, the first display panel D1 and the second display panel D2 may be manufactured in advanced through two independent production lines. The first display panel D1 may be a flexible electrophoretic display panel and the second display panel D2 may be a rigid electrophoretic display panel.

In the present embodiment, the first display panel D1, such as the flexible electrophoretic display panel, includes a flexible carrying substrate (not shown) which is, for example, a plastic substrate. The flexible carrying substrate can carry an electrophoresis layer (not shown) and other related elements. The second display panel D2, such as the rigid electrophoretic display panel, includes a rigid carrying substrate (not shown) which is difficult to be bent. The rigid carrying substrate is, for example, a glass substrate. The rigid carrying substrate can carry an electrophoresis layer (not shown) and other related elements. In the present embodiment, the thickness D11 of the first display panel D1 is smaller than the thickness D21 of the second display panel D2. The length D12 of the first display panel D1 is larger than the length D22 of the second display panel D2. The width D13 of the first display panel D1 is larger than the width D23 of the second display panel D2.

Figure 3C:
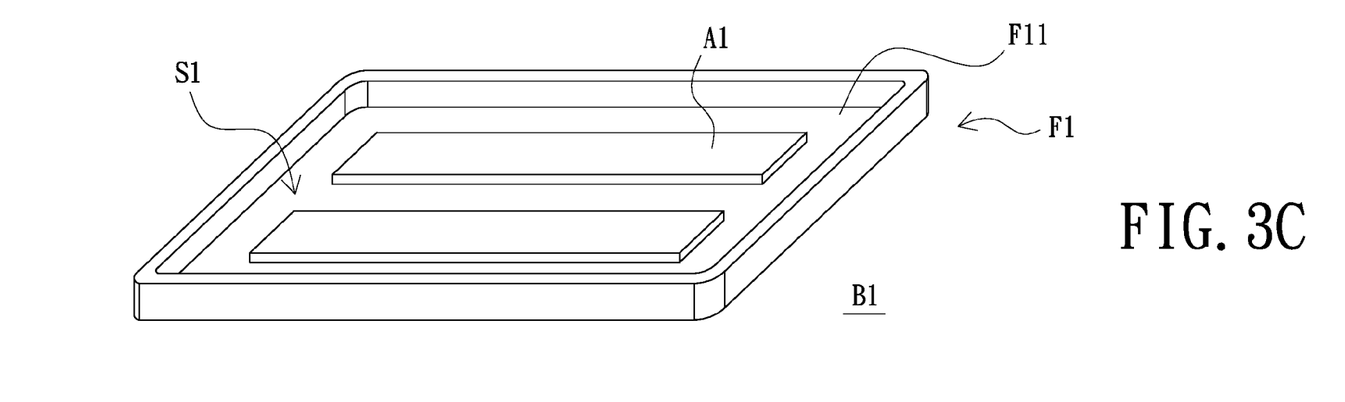
Figure 3D:
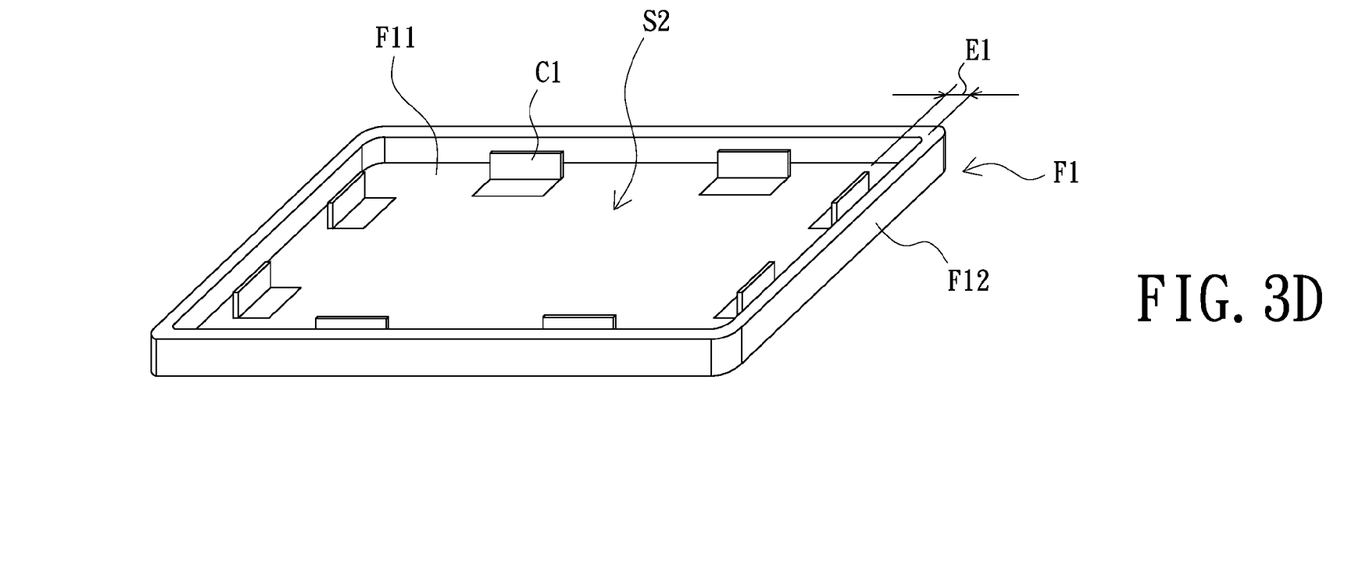

Next, referring to FIGS. 2, 3C and 4, at step S004, at least one pad A1 is formed on the bottom portion F11 of the bottom frame F1 such that a first base B1 adapted to be assembled to the first display panel D1 is formed if the bottom frame F1 is designed for being assembled to the first display panel D1. A plurality of the pads A1 are schematically shown in FIG. 3D. In other words, the first base B1 includes the bottom frame F1 and the pads A1. In the present embodiment, each of the pads A1 may be a tape. Particularly, the first display panel D1 may be disposed on the pads A1 and located in the first accommodating space S1. The corresponding top frame T1 (FIG. 6) may be assembled to the first base B1 by means of fixing screws or clasping. The view area D14 of the first display panel D1 is exposed by the top frame T1 (FIG. 6). Accordingly, the relative position of the first base B1, the top frame T1 (FIG. 6) and the first display panel D1 is fixed such that a first display device (not shown) is formed.

Next, referring to FIGS. 2, 3D and 5, at step S005, the bottom portion F11 of the bottom frame F1 is punched to form a plurality of barricades C1 if the bottom frame F1 is designed for being assembled to the second display panel D2. The barricades C1 are arranged along the side walls F12. Each of the barricades C1 maintains a distance E1 from the corresponding side wall F12. The barricades C1 and the bottom portion F11 together form a second accommodating space S2 in the first accommodating space S1 (FIG. 3B).

Figure 3E:
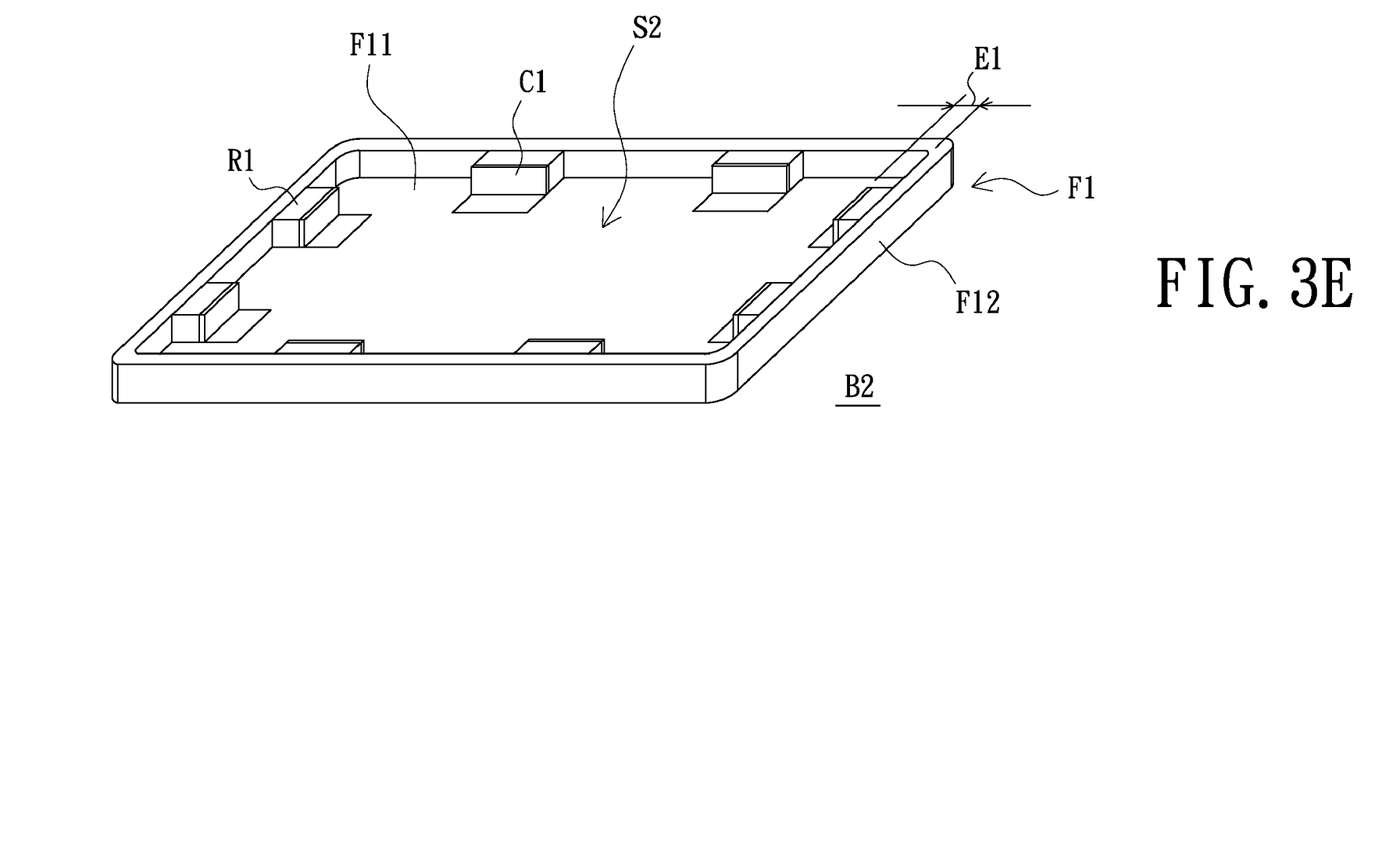

Finally, referring to FIGS. 2 and 3E, in the present embodiment, at step S006, a buffer R1 is disposed between each of the barricades C1 and the corresponding side wall F12 such that the structural strength of the structure composed of each of the barricades C1, the corresponding buffer R1 and the corresponding side wall F12 is improved. At this point, a second base B2 of the present embodiment adapted to be assembled to the second display panel D2 is formed. In other words, the second base B2 of the present embodiment includes the bottom frame F1, the barricades C1 and the buffers R1.

Particularly, the second display panel D2 may be disposed on the bottom portion F11 of the second base B2 and located in the second accommodating space S2. The corresponding top frame T1 (FIG. 6) may be assembled to the second base B2 by means of fixing screws or clasping. The view area D24 of the second display panel D2 is exposed by the top frame T1 (FIG. 6). Accordingly, the relative position of the second base B2, the top frame T1 (FIG. 6) and the second display panel D2 is fixed such that a second display device (not shown) is formed.

It should be noted that in another embodiment, if the structural strength of the barricades C1 is strong enough to satisfy the designer's requirement, the buffers R1 of the second base B2 may be omitted.

Accordingly, the method of manufacturing a base of the embodiment of the present invention at least has one of the following advantages or other advantages.

First, the bottom frame of one size can be machined, and the first base applicable to the first display panel of the first size or the second base applicable to the second display panel of the second size is manufactured from the bottom frame. Therefore, compared to the conventional art, the cost of selectively manufacturing the different bases according to the method of the embodiment of the present invention is relatively low. In addition, the complexity of selectively manufacturing the different bases according to the method of the embodiment of the present invention is relatively little.

Second, because the bottom frame has the arc-shaped connection portion, therefore the structural strength of the bottom frame as a whole is improved.

Third, each of the buffers is disposed between the corresponding barricade and the corresponding side wall. Therefore, regarding the second base, the structural strength of each of the barricades, the corresponding buffer and the corresponding side wall is improved.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of manufacturing a base, comprising:
   providing a plate;
   machining the plate to form a bottom frame, wherein the bottom frame has a bottom portion and a plurality of side walls disposed at the bottom portion, and the side walls and the bottom portion together form a first accommodating space;
   determining whether the bottom frame is designed for being assembled to a first display panel or a second display panel, wherein the thickness of the first display panel is smaller than the thickness of the second display panel, the length of the first display panel is larger than the length of the second display panel, and the width of the first display panel is larger than the width of the second display panel;

forming at least one pad at the bottom portion of the bottom frame such that a first base adapted to be assembled to the first display panel is formed if the bottom frame is designed for being assembled to the first display panel, wherein the first display panel is adapted to be disposed on the pad and located in the first accommodating space; and punching the bottom portion of the bottom frame to form a plurality of barricades such that a second base adapted to be assembled to the second display panel is formed if the bottom frame is designed for being assembled to the second display panel, wherein the barricades are arranged along the side walls, each of the barricades maintains a distance from the corresponding side wall, the barricades and the bottom portion together form a second accommodating space in the first accommodating space, and the second display panel is adapted to be disposed in the second accommodating space.

2. The method of manufacturing a base as claimed in claim 1, further comprising disposing a buffer between each of the barricades and the corresponding side wall after the barricades are formed.

3. The method of manufacturing a base as claimed in claim 1, wherein the bottom frame further has at least one arc-shaped connection portion, the side walls and the arc-shaped connection portion are disposed on the bottom portion, and the arc-shaped connection portion connects two of the side walls and is bendingly disposed between the corresponding two of the side walls.

* * * * *